(No Model.)   4 Sheets—Sheet 1.

J. W. BROWN & J. W. BROWN, Jr.
APPARATUS FOR LOADING AND UNLOADING VESSELS.

No. 263,846.   Patented Sept. 5, 1882.

WITNESSES:
Fred. G. Dieterich
Edw. W. Byrn

INVENTOR:
Jno. Wilson Brown
Jno. Wilson Brown Jr.
BY
ATTORNEYS.

(No Model.) 4 Sheets—Sheet 2.
J. W. BROWN & J. W. BROWN, Jr.
APPARATUS FOR LOADING AND UNLOADING VESSELS.
No. 263,846. Patented Sept. 5, 1882.
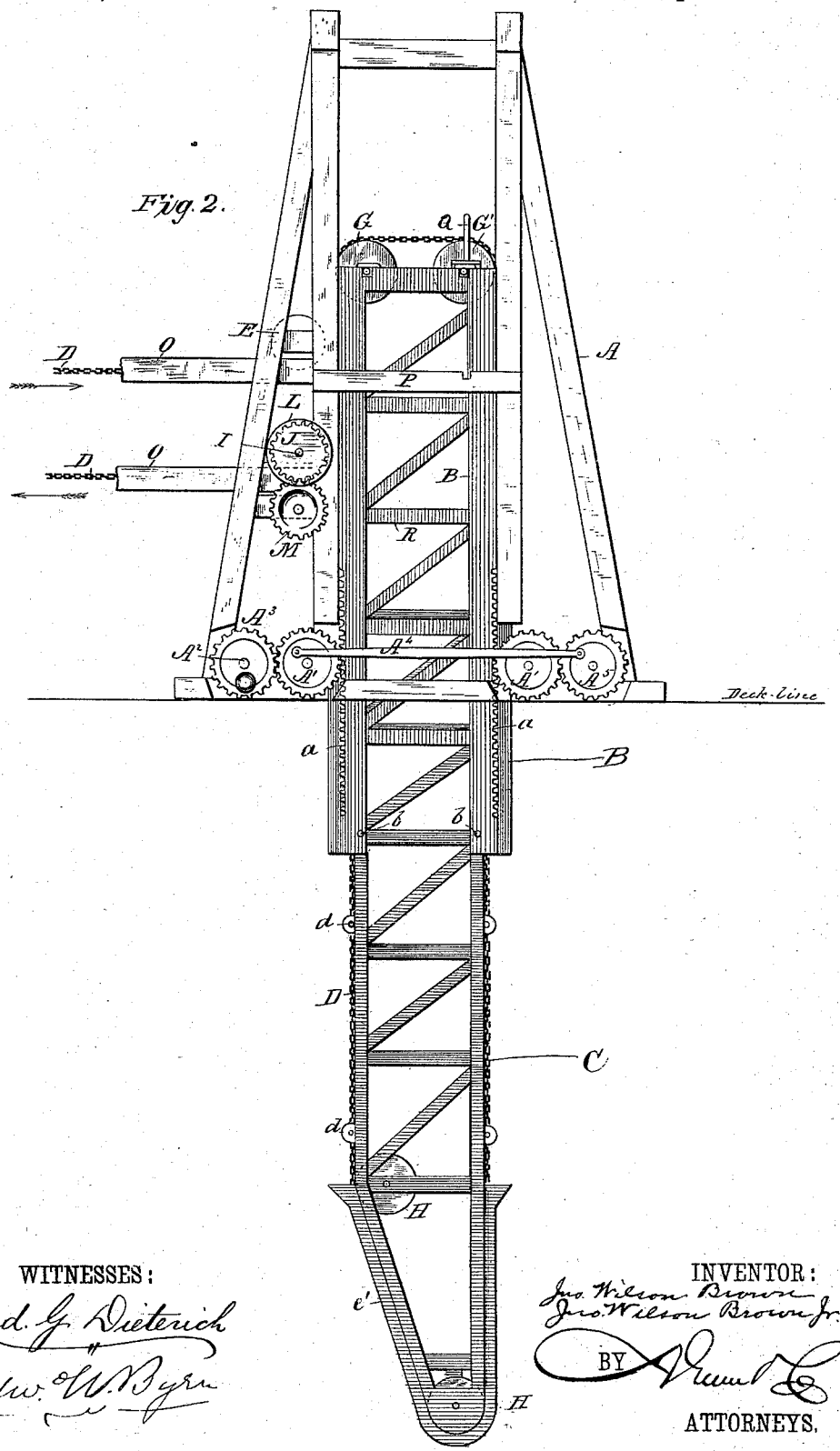

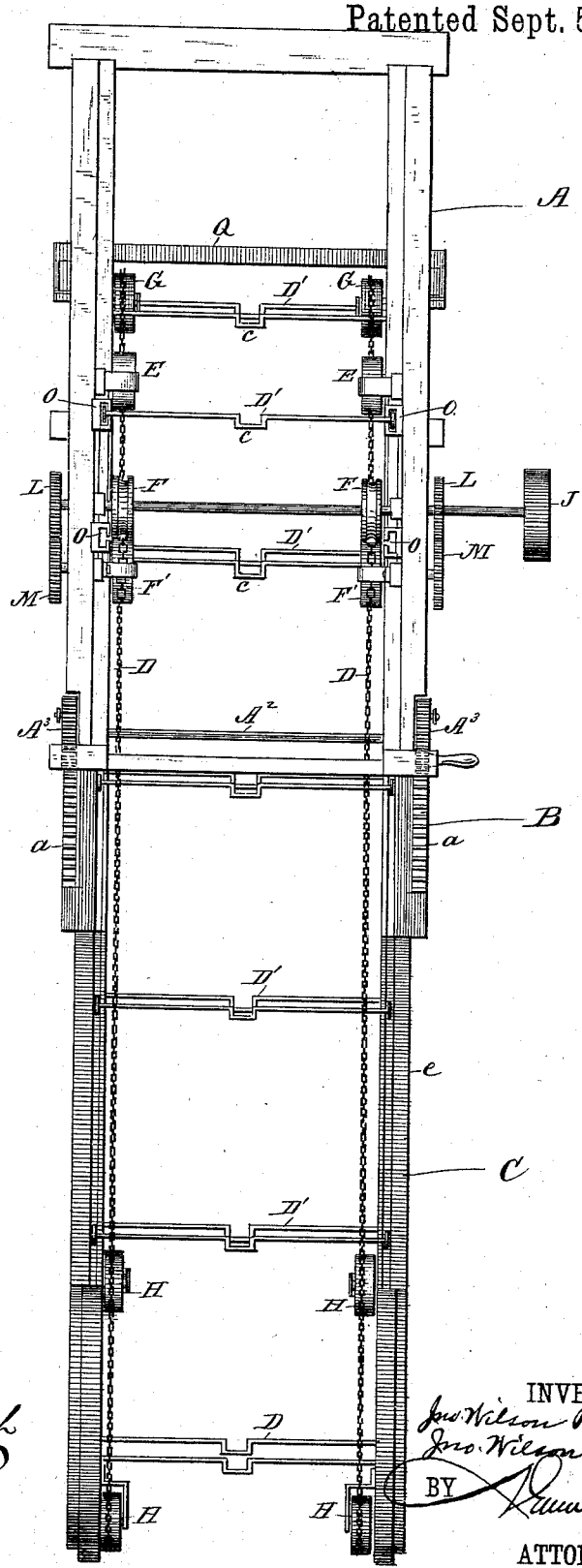

(No Model.) 4 Sheets—Sheet 4.

J. W. BROWN & J. W. BROWN, Jr.
APPARATUS FOR LOADING AND UNLOADING VESSELS.

No. 263,846. Patented Sept. 5, 1882.

WITNESSES: INVENTOR:

ATTORNEYS.

UNITED STATES PATENT OFFICE.

JOHN WILSON BROWN AND JOHN WILSON BROWN, JR., OF BALTIMORE, MD.

APPARATUS FOR LOADING AND UNLOADING VESSELS.

SPECIFICATION forming part of Letters Patent No. 263,846, dated September 5, 1882.

Application filed June 26, 1882. (No model.)

*To all whom it may concern:*

Be it known that we, JOHN WILSON BROWN and JOHN WILSON BROWN, Jr., of Baltimore city, State of Maryland, have invented a new and Improved Apparatus for Loading and Unloading Vessels; and we do hereby declare that the following is a full, clear, and exact description of the same, reference being had to the accompanying drawings, forming part of this specification.

The object of our invention is to provide an apparatus for loading and unloading vessels in a more expeditious manner.

It consists in the peculiar construction and arrangement of a removable frame-work, which is to be located above the hatchway of the vessel, provided with independently-moving and downwardly extensible sections of frame-work, which may be extended a greater or less depth into the hold of the vessel, and which sliding sections of the frame-work are provided with guides for and are combined with an endless carrier, to which the packages are slung, and by which they are raised or lowered and transported across the deck to or from the wharf.

Figure 1:
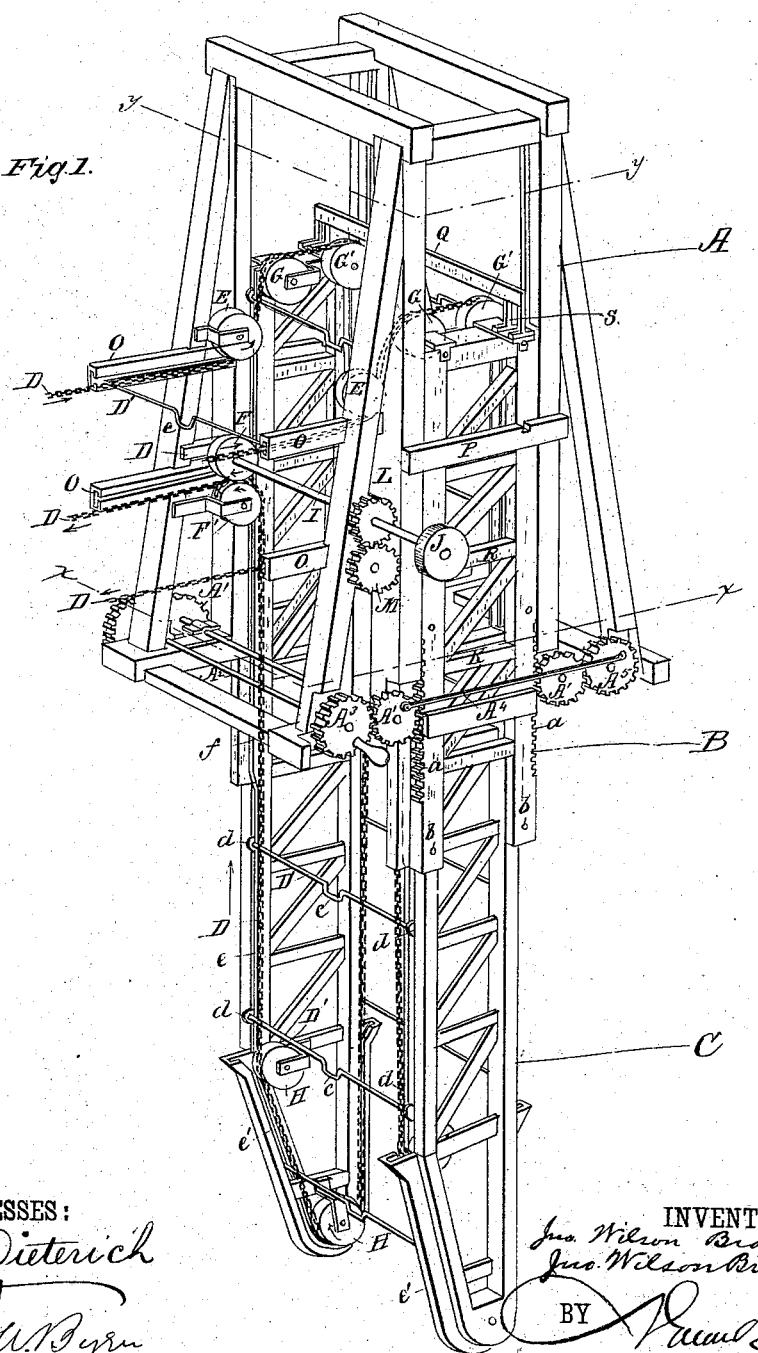
Figure 5:
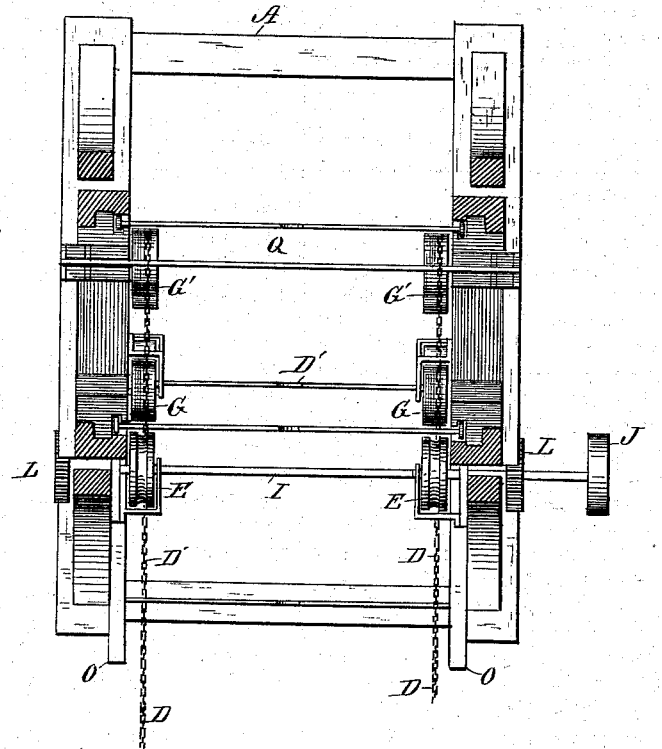
Figure 4:
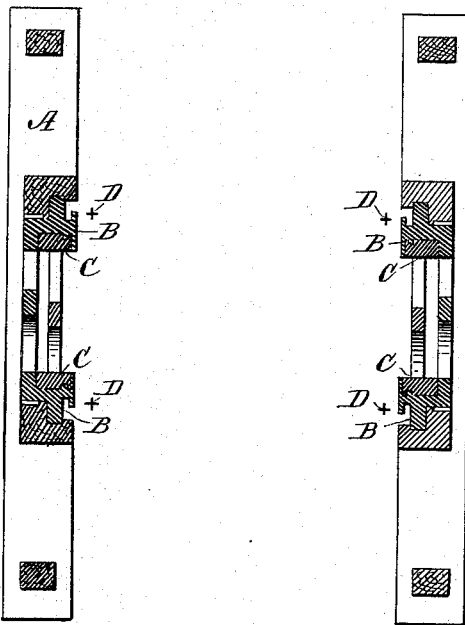

In the drawings, Figure 1 is an isometric projection, in perspective, of the apparatus. Fig. 2 is a side elevation. Fig. 3 is a front elevation. Fig. 4 is a horizontal section through the line $x\,x$ of Fig. 1; and Fig. 5 is a view looking down upon the frame B and C, the view being partly in section through line $y\,y$ of Fig. 1.

The apparatus consists, in the main, of four separate parts, of which A is in the nature of a derrick, which is set over the hatchway; another of which, B, is an adjustable frame sliding downwardly in guides in A; another of which, C, is an adjustable frame sliding in guides in B; and the fourth of which is an endless carrier, D, moving around the adjustable frames B and C.

The relatively stationary frame or derrick A consists of a rectangular horizontal frame resting upon the deck above the hatchway with four upright posts connected by a rectangular frame at the top and provided with oblique side braces.

The frame B has four corner-posts, which rest against the corner-posts of the derrick, and are guided with a vertical adjustment thereagainst. For the adjustment of the frame B in A, racks $a$ are formed on the corner-posts of B, and a wheel, $A'$, is journaled in a bearing in frame A at each corner, so as to engage with each of said racks, and motion is imparted to these wheels through a shaft, $A^2$, bearing gear-wheels $A^3$ and a crank-handle, which wheels $A^3$ mesh with the wheels $A'$ and serve to raise or lower the frame B. To secure an equal movement of all the wheels $A'$, those on the same side of the frame are connected by a parallel-motioned connecting-rod, $A^4$, and pinion $A^5$.

The object in putting the crank-handle on an independent shaft, $A^2$, is to connect the two pairs of wheels $A'$ and $A^3$ on opposite sides, and still give room for the packages to be raised.

For holding the frame B to its adjustment in A, a pawl-and-ratchet mechanism or stop-bolt may be used.

The frame C is constructed, as shown, with four corner-pieces suitably braced and sliding in the four corner-pieces of B. This frame is made adjustable in B, and its adjustment fixed by bolts $b$, that pass through the corner-posts of B into holes in the corner-posts of C.

The carrier D is made of two chains connected by cross-bars $D'$, which have a bent portion, $c$, in the middle, upon which the packages are slung, and the ends of which cross-bars project beyond the chains, and are provided with friction-rollers $d$, that travel in guides in the several sections of frame-work. These guides are shown at $e$ in the lower section, C, and at $f$ in the section B. In the lower section, C, said guides are merely open grooves in the corner-posts, so that the rollers $d$ of the carrier can at any adjustment between B and C pass from the guide $e$ to the guides $f$. At the bottom part of the section C, however, the guides $e'$ are partially inclosed, so as to receive and house the rollers $d$ as they pass around the lower end of said section.

For guiding the carrier D in its travel, a pair of pulleys, E E, is arranged in the derrick-frame, and two more pairs, F F F' F', are journaled in the same just beneath the first pair, the last two pairs being arranged tangential to each other. Then in the movable sections of the frame there are four pulleys, G G G' G', at the top of frame B, and four more, H H H H, at the bottom of frame C. The carrier then travels (in unloading a vessel) under the pulley E, over G G', down one side of frame C, around the pulleys H, thence up and between the pulleys F and F', and thence to another device, which descends, and the carrier dumps the packages and returns the carrier to the upper pulleys, E. This device I have not shown in this application, but it may be found in two other applications filed this same day, and marked Cases "B" and "C" in which two forms of it are shown and described.

For driving the carrier a shaft, I, is provided with a band-pulley, J, for connecting with the donkey-engine or other power, and is firmly journaled in the derrick-frame. To this shaft are fastened the two pulleys F F, that rest inside the frame-work and travel on top of the chain, and also two gear-wheels, L L, that are outside of the frame and communicate their motion to gear-wheels M M just below. These gear-wheels M M are fixed on short shafts journaled in the derrick-frame, which inside of the frame bear chain-wheels F', over which the chains of the carrier pass and by which said chains are driven, the wheels above serving to hold the chains always to a firm engagement with said wheel.

The peripheral measurement of the wheels F' should be a multiple of the distance between the cross-bars D' of the carrier and have notches to receive the projecting ends of said bars.

P is a cross-bar, of which there is one on each side of the derrick-frame, which bar is notched to receive the projecting end of a bar, Q, on the frame B and limit the downward adjustment of said frame. This bar P is so located that when the bar Q strikes it the top of the pulleys on frame B will just be on a level with the bottom of the pulleys E E on the derrick-frame, so that the carrier will pass straight across to the opposite side of frame B when the latter is at its lowest adjustment.

For unloading a vessel the derrick-frame is mounted above the hatchway and the carrier distended from the derrick to the apparatus on the wharf before referred to, the carrier between the said apparatus on the wharf and the derrick being sustained by side rails, O O, grooved to receive the rollers on the ends of the cross-bars D' of the carrier. Motion being now imparted to the main drive-shaft I, the carrier is made to travel in the direction of the arrows, and the frames B and C being at the proper adjustment to commence removing articles from the hold, the barrels and packages are hung in slings and hitched upon the middle loops, c, of the cross-bar at the bottom, and are carried up along deck and thence outward to the wharf. After the hold has been partly cleared, and the frames B and C require adjustment down to the articles not yet removed, the frames B and C are, without any change in their relation to each other, adjusted farther down into the hold by means of the crank-shaft $A^2$, the wheels A', and the rack or frame B, and in this adjustment it will be seen that while the carrier-frames are projected lower down into the hold of the ship no increase or variation in the length of the carrier-chains is required, for the pulleys G approach E just to the same extent that the pulleys H descend from F F'. This variation in the adjustment of the frame B in A without alteration in the length of the carrier saves much time and very greatly facilitates the loading or unloading. When, however, it is necessary to extend the section C down in its guides inside of B, then the chains of the carrier are disconnected and a supplemental section put in. For this purpose C is made fast to A and disconnected from B. B is then raised, and the bolts that connect B and C together are then put in place, and, the supplemental chain having been inserted, C is extended the desired distance, after which the operation is the same as before.

In constructing the frame B its corner-pieces are secured to each other in pairs by braces R, which pairs of corner-posts are connected by other transverse middle braces, which are placed in when the section C is extended, and removed when it is drawn up. Of the pulleys G and G' at the top of section B, those shown at G are journaled in frame B; but those at G' on the back part of the frame are set in pieces S that drop in notches in the top of frame B, and are connected by bar Q. This bar and the pulleys G' are detachable from frame B, so that the latter may pass below pulleys E, and leave the pulleys G' on stop-bar P, and thus secure a greater adjustment of B when additional sections of chain are used.

In the relative arrangement of the parts of the frame traversed by the carrier it will be seen that the guides e and f are located a considerable distance from the middle of the frames, and the chains forming the carrier travel over separate sets of pulleys near the ends of the cross-bars, D', while the cross-bars are a sufficient distance apart to allow articles to be suspended between them. This is an important feature, for it permits heavy articles—such as hogsheads of tobacco, &c.—to be suspended on the carrier-chains with their centers of gravity immediately beneath the rods D', thereby avoiding the distortion of the chains and other objectionable effects of leverage exerted upon the chain by said suspended weights.

Having thus described our invention, what we claim as new is—

1. The combination, with the derrick-frame A, having two sets of guide-pulleys for the carrier arranged on stationary axes, of one or more vertically-adjustable sections of framework sliding in the derrick-frame and bearing pulleys at the top and bottom, and an endless carrier passing from one set of stationary pulleys up and over the upper movable pulleys, and extending from the lower set of stationary pulleys down and under the other set of movable pulleys, substantially as and for the purpose described.

2. The apparatus herein described, consisting of a set of extensible frames having guides for an endless carrier located at a distance from the middle of said frames and separate pulleys for the two chains of said carrier, in combination with the carrier composed of two chains with rods D', spaced as described, and having their ends arranged in said guides, as and for the purpose set forth.

3. The combination, with the derrick-frame A, having guide-pulleys E and drivers F', of the vertically-adjustable frame B, having pulleys G G', the carrier passing under pulleys E and over G G', and stop devices, substantially as described, for limiting the downward movement of the pulleys G' to the level of the carrier-chains, as and for the purpose set forth.

4. The combination, with the stationary derrick-frame A, of the extensible frame B, moving in guides in the derrick-frame, the extensible frame C, moving in guides in the frame B, and the endless carrier passing around the same, substantially as shown and described.

JOHN WILSON BROWN,
JOHN WILSON BROWN, Jr.

Witnesses:
FELIX R. SULLIVAN,
FRANK SULLIVAN.